US006876469B1

(12) United States Patent
Nakamura

(10) Patent No.: US 6,876,469 B1
(45) Date of Patent: Apr. 5, 2005

(54) TRANSMITTING/RECEIVING SYSTEM FITTED WITH BACKUP FUNCTION

(75) Inventor: Takeshi Nakamura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/484,834

(22) Filed: Jan. 18, 2000

(30) Foreign Application Priority Data

Jan. 18, 1999  (JP) ............................................ P11-008598

(51) Int. Cl.$^7$ ................................................ H04N 1/04
(52) U.S. Cl. ...................... 358/437; 358/468; 358/1.15; 358/400; 358/404
(58) Field of Search ................................ 358/437, 468, 358/1.15, 400, 404, 405

(56) References Cited

U.S. PATENT DOCUMENTS

| | | | | |
|---|---|---|---|---|
| 4,323,987 A | * | 4/1982 | Holtz et al. | 365/229 |
| 5,668,642 A | * | 9/1997 | Yoshida | 358/437 |
| 5,708,820 A | * | 1/1998 | Park et al. | 713/323 |
| 5,956,052 A | * | 9/1999 | Udagawa et al. | 347/19 |
| 6,137,586 A | * | 10/2000 | Kato | 358/1.14 |

FOREIGN PATENT DOCUMENTS

| | | |
|---|---|---|
| JP | 63-248274 | 10/1988 |
| JP | 2-7662 | 1/1990 |
| JP | 5-95444 | 4/1993 |
| JP | 5-167826 | 7/1993 |
| JP | 5-241978 | 9/1993 |
| JP | 7-7579 | 1/1995 |

* cited by examiner

Primary Examiner—Kimberly Williams
Assistant Examiner—Negussie Worku
(74) Attorney, Agent, or Firm—David G. Conlin; Steven M. Jensen; Edwards & Angell, LLP

(57) ABSTRACT

An object of the invention is to reliably back up data stored in a memory provided in a transmitting/receiving apparatus by using a volatile memory even when a power source is shut down for a long period of time. The transmitting/receiving apparatus includes an image information memory composed of a volatile memory for storing at least image information, a control display section, a printing section, a scanner and a transmitting/receiving control section connected via a data bus line with a communication control section for transmitting/receiving via a telephone line. A main power source circuit supplies power to required sections in accordance to instructions of the control section. Then, the switching control section supplies power from a backup power source when it detects that the power source is shut-down. Then, receiving an instruction from the switching control section due to the shut-down of the power source, the transmission/receiving control section carries out a process for transferring data stored in the image information memory to another transmitting/receiving apparatus registered in advance via the control display section to evacuate and back up the data at the transfer destination to avoid a situation in which the data cannot be backed up by the backup power source.

4 Claims, 5 Drawing Sheets

TRANSMITTING/RECEIVING SYSTEM FITTED WITH BACKUP FUNCTION

BACKGROUND OF THE INVENTION

1. Field of the Invention

The present invention relates to a transmitting/receiving system capable of transmitting/receiving required data by connecting facsimile machines and other transmitting/receiving apparatuses thereto via a network or telephone line and more specifically to a transmitting/receiving system provided with a backup function for backing up the required data when the power source is shut down.

2. Description of Prior Art

In recent years, a transmitting/receiving apparatus such as a facsimile machine, systematized so that required data is received from or transmitted to the other party has come to be provided with a non-volatile memory for holding the transmitting/receiving data in general in the multiplication and advancement of its functions.

As a memory for storing the receiving data, however, is employed a volatile memory in which received data is not preserved when the power source is shut down, except some high-class and high-price apparatuses. For this reason, the stored transmitting/receiving data will be lost by sudden shut-down of the electric source. Therefore, as means for preserving the data in the volatile memory, a spare backup power source for temporarily supplying power is provided beside the main power source to supply power from the backup power source when the power source is shut down.

The spare backup power source operates effectively when the power source is shut down temporarily by an operator's careless operation. However, in case when the power source is shut down for a long period of time due to a power failure for example, the stored data is lost at the moment of time when no power can be supplied due to the time limit of the backup power source.

Some apparatuses such as conventional personal computers are constructed so as to hold the data stored in the volatile memory by transferring to a non-volatile memory such as an internal fixed magnetic disk when the power source is switched to the backup power source by detecting a power failure.

A multi-function apparatus having functions as a facsimile, a copier, a printer and a scanner is provided with an image information memory for transmitting/receiving images using the volatile memory and having a capacity of 2M bytes, i.e., image data of 120 sheets in terms of A4 size paper. However, the capacity of a system memory for storing registration data and management data and that of a program memory for storing programs executed by a CPU, i.e., a transmission/receiving controller, using the non-volatile memory is 64 K bytes, respectively (capable of storing about four sheets of image data in terms of A4 size paper). Therefore, it is unable to transfer and store the transmitting/receiving data stored in the volatile memory to the non-volatile memory provided in advance in the apparatus.

Accordingly, it is necessary to provide separately a non-volatile memory such as a fixed magnetic disk for saving the transmitting/receiving data in order to preserve the transmitting/receiving data stored in the volatile memory within the apparatus. Since it is necessary to provide the non-volatile memory having a capacity equal to or greater than that of the transmitting/receiving data storage memory separately, its cost becomes high naturally. Still more, since that memory is mainly used only during a power failure or the like, its use frequency is low and is very wasteful.

Then, Japanese Unexamined Patent Publication JP-A 5-95444 (1993) describes a technology which allows an operator to transfer data stored in a volatile memory of a transmitting/receiving apparatus A to another transmitting/receiving apparatus B prior to shutting down a power source of the transmitting/receiving apparatus A temporarily to repair a failure of a printer part or the like in the transmitting/receiving apparatus including the above-mentioned multi-function apparatus. It allows the transmitting/receiving data to be transferred and stored in the other transmitting/receiving apparatus when the printer or the like is in trouble. Therefore, it becomes possible to evacuate and to back up the required data in the other transmitting/receiving apparatus.

Japanese Unexamined Patent Publication JP-A 5-241978 (1993) discloses a technology of transferring and storing data stored in a microcomputer whose power source is not backed up to a microcomputer whose power source is backed up when the power source is shut down in an electronic apparatus provided with a plurality of microcomputers. It then allows the required data to be backed up by evacuating to the other microcomputer when the power source is shut down.

However, the destination to which the data stored in the apparatus whose power source is shut down or the data stored in the microcomputer whose power source is not backed up is transferred is fixed in the technologies described in the above-mentioned two publications. Accordingly, they are inconvenient because the data cannot be transferred to any apparatus or microcomputer arbitrarily.

SUMMARY OF THE INVENTION

It is an object of the invention to provide a transmitting/receiving system provided with a backup function which allows required transmitting/receiving data to be protected by transferring to any transmitting/receiving apparatus when a power source is shut down.

The invention provides a transmitting/receiving system for transmitting/receiving data, provided with a data back-up function comprising:

transmitting/receiving apparatuses connected to each other via a network or telephone line, the transmitting/receiving apparatus including:

storage means for storing transmitting/receiving data, the storage means being realized by a volatile memory, and a control section for setting and registering in advance a destination transmitting/receiving apparatus to which data stored in the storage means is to be transferred; and control means for transferring the data stored in storage means of a transmitting/receiving apparatus whose power source is shut down, to the destination transmitting/receiving apparatus which is set and registered in advance by the control section of the transmitting/receiving apparatus to store and hold the data.

According to the invention, a first transmitting/receiving apparatus is connected with a second transmitting/receiving apparatus via the network or telephone line. When the power source of the first transmitting/receiving apparatus is shut down, the data stored in the storage means of the first transmitting/receiving apparatus is transferred to the storage means of the second transmitting/receiving apparatus, which is operable, by the transferring process to be evacuated and stored. Accordingly, the stored data of the first transmitting/ receiving apparatus whose power source has been shut down may be held reliably in the second transmitting/receiving apparatus. The transferred data may be held reliably by the second transmitting/receiving apparatus even in the case of storing the data in a volatile memory. Such transmitting/receiving system allows the transmitting/receiving data stored in the first transmitting/receiving apparatus to be transferred to the second transmitting/receiving apparatus via the network or telephone line for protection even in case of unintentional shut down of the power source of the transmitting/receiving apparatus, a power failure or the like. It is also possible to back up the data reliably by using the low cost volatile memory without using another non-volatile memory to store the data.

Further, since the second transmitting/receiving apparatus to which the data is to be transferred has been set and registered in the first transmitting/receiving apparatus in advance in preparation for shut-down, the second transmitting/receiving apparatus can back up the data reliably. Since the operator of the first transmitting/receiving apparatus can select a transmitting/receiving apparatus to which data may be transferred favorably for the operator, the operator can readily find the destination to which the data has been transferred and can take out the transferred data readily and conveniently.

It is noted that the data can be backed up reliably by setting and registering a plurality of data transfer destinations even when one transfer destination is unable to receive the data, because the data may be transferred and received by another transfer destination.

In the invention it is preferable that the control section of the transmitting/receiving apparatus sets a confidential transmission while setting and registering the transmitting/receiving apparatus to which the data is to be transferred.

According to the invention, it is possible to prevent the data transferred from the first transmitting/receiving apparatus to the second transmitting/receiving apparatus when the power source of the first transmitting/receiving apparatus is shut down from being outputted by unintentional or intentional manipulation at the second transmitting/receiving apparatus and to prevent internal secret data from being leaked for example. The transferred data cannot be outputted from the second transmitting/receiving apparatus unless using a predetermined specific ID number or password by setting the confidential transmission. Accordingly, it becomes possible to prevent the data from being outputted unintentionally or intentionally and to keep the secret. Not only the transmitting/receiving apparatuses internally connected by the network such as LAN but also the transmitting/receiving apparatuses externally connected via a telephone line may be designated as the transfer destination, thus allowing the back-up function with general versatility.

In the invention it is preferable that the transmitting/receiving apparatus further includes a backup power source for storing and holding the data stored in the storage means and the control means supplies power from the backup power source to the storage means of the transmitting/receiving apparatus whose power source has been, shut down and carries out the transferring process by the power supplied from the backup power source.

According to the invention, it becomes possible to transfer the data stored in the first transmitting/receiving apparatus reliably to the second transmitting/receiving apparatus and to back up therein by utilizing the backup power source for holding the data stored in the storage means temporarily when the power source is shut down. It is noted that when the backup power source has not only electric energy for holding the data stored in the storage means but also electric energy for operating the transmitting/receiving apparatus for example, it is possible to arrange so as to continue the operation of the transmitting/receiving apparatus and to transfer the data stored in the storage means at the point of time when the backup power drops and it becomes impossible to continue the operation.

In the invention it is preferable that the transmitting/receiving system further comprises storage means composed of a non-volatile memory for storing completion data transferred from the transmitting/receiving apparatus of the transfer destination indicative of the completion of data transfer and the control means informs of the transmitting/receiving apparatus to which the data has been transferred based on the completion data stored in the storage means when the power source of the transmitting/receiving apparatus recovers from shutdown.

According to the invention, the operator can find the destination to which the data has been transferred readily and reliably as the power source recovers and can execute the processes thereafter readily. That is, the operator can obtain the transferred data readily by outputting by the second transmitting/receiving apparatus.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
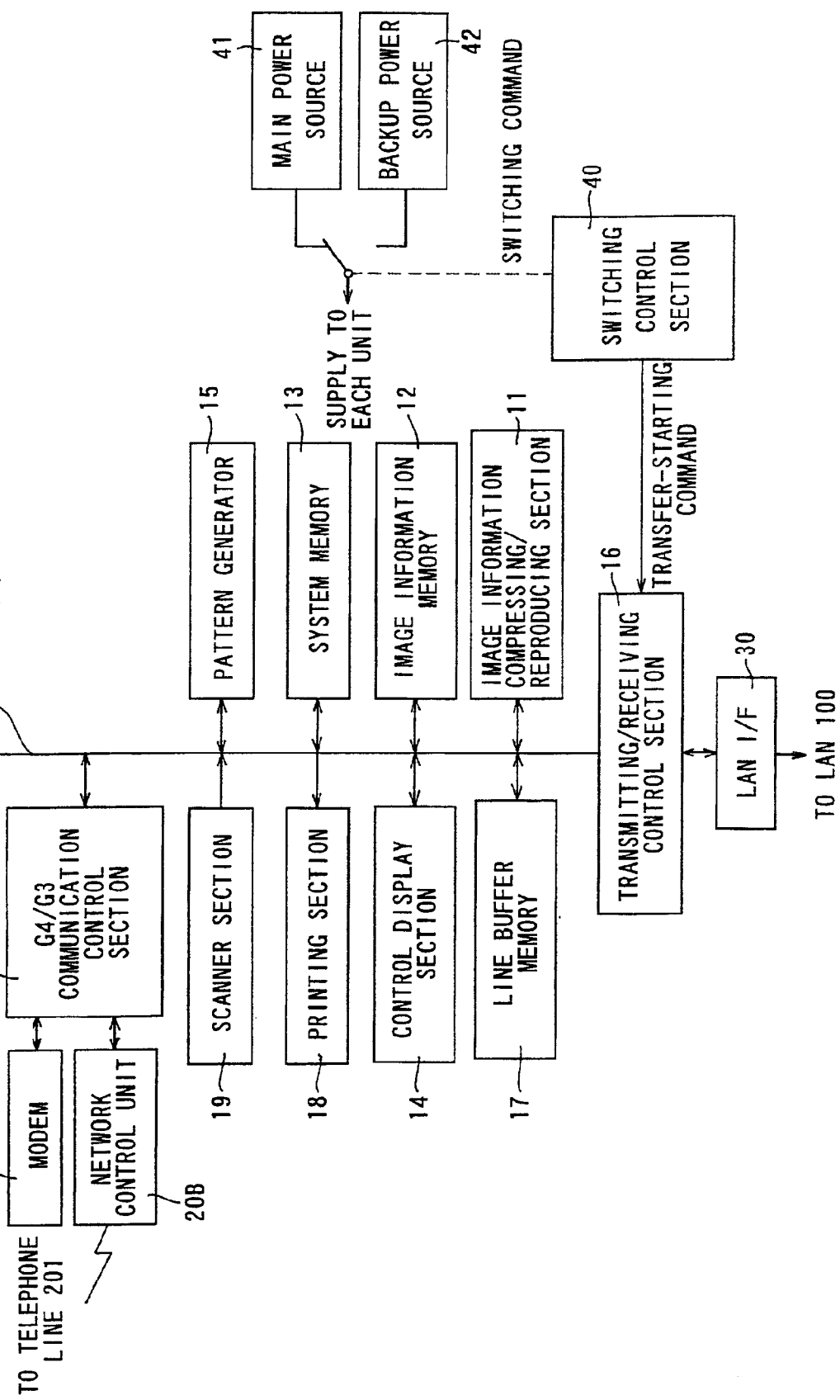
FIG. 1 is a block diagram for explaining the overall structure of a transmitting/receiving apparatus and a system structure in which the transmitting/receiving apparatuses are connected via a network or external line.

Now referring to the drawings, preferred embodiments of the invention are described below.

One embodiment of transmitting/receiving system provided with a backup function according to the invention will be explained below with reference to the drawings.

Figure 2:
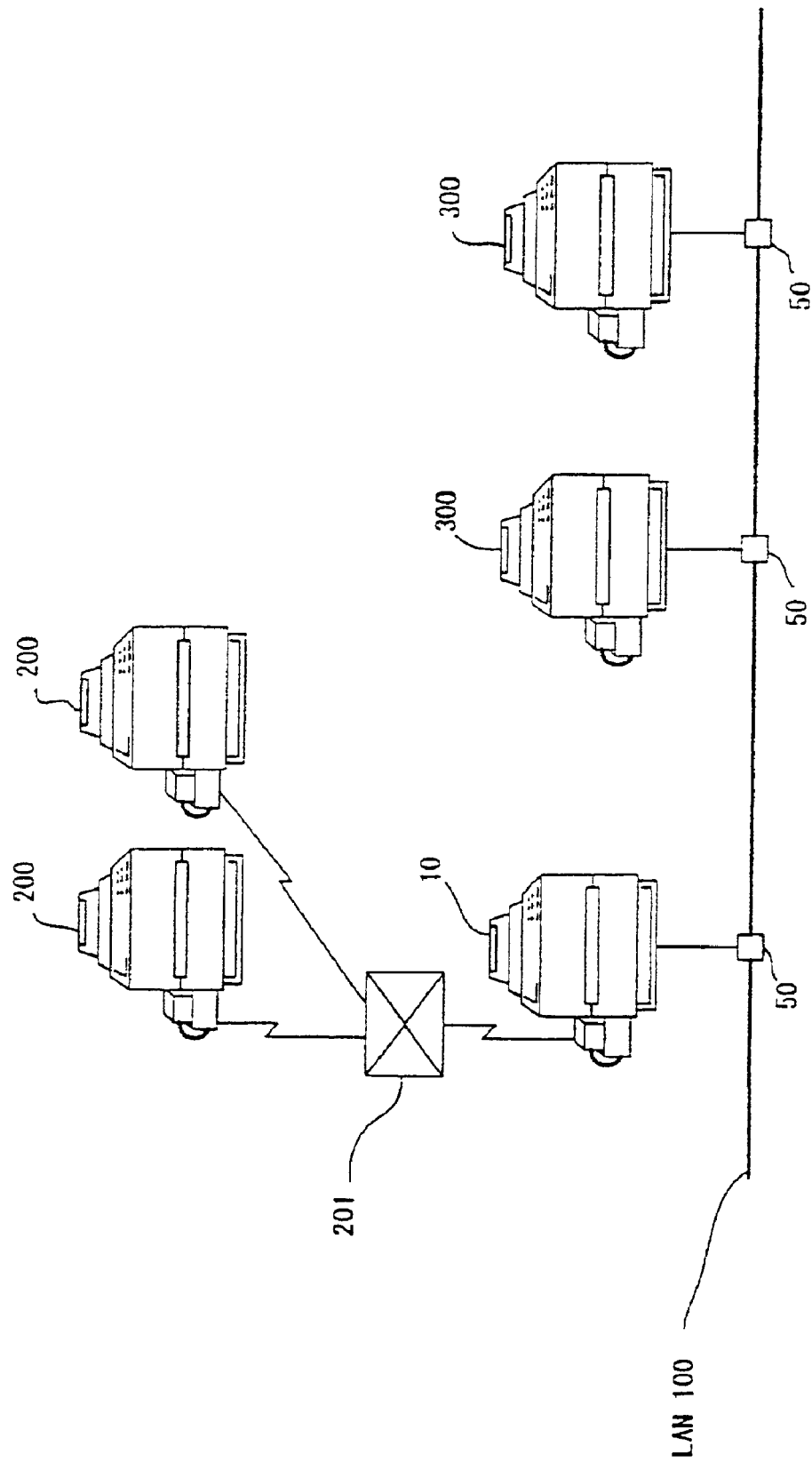
FIG. 2 is a conceptual drawing showing the overall system structure in which the inventive transmitting/receiving apparatuses are connected via the network and the telephone line.
Figure 3:
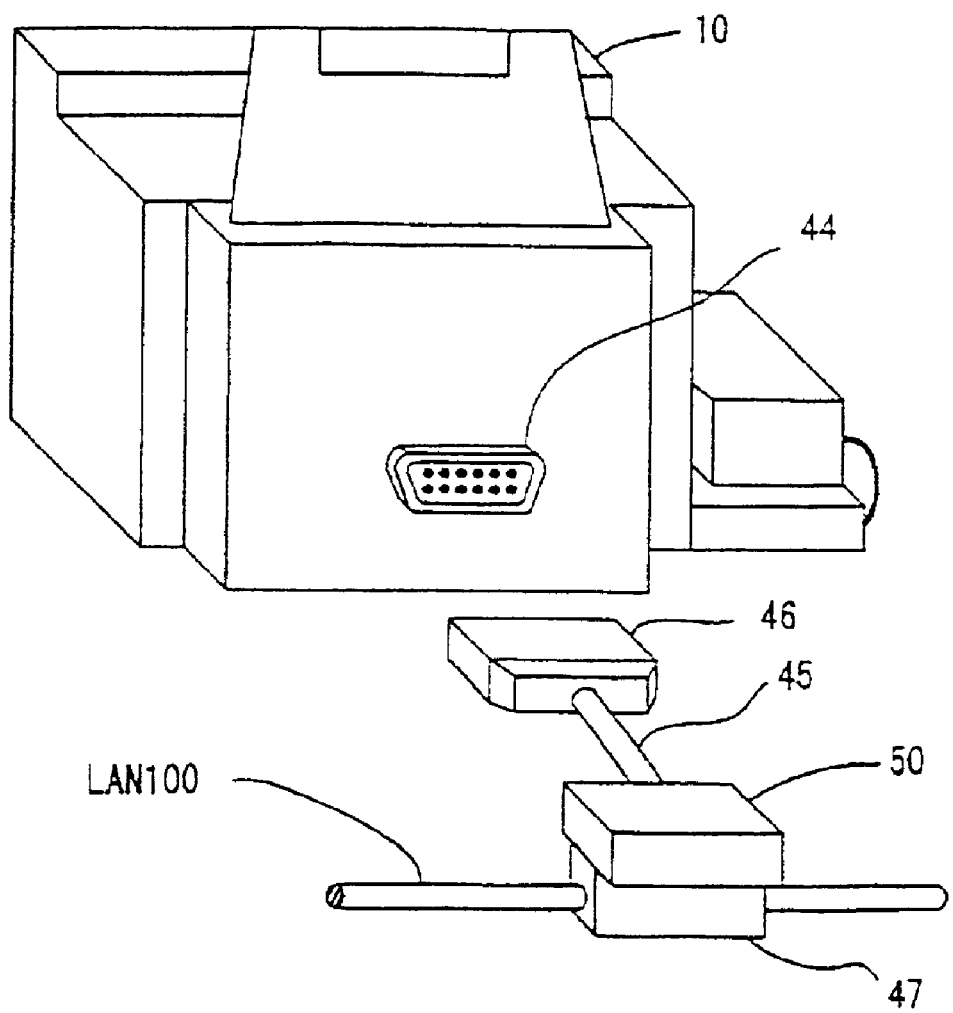
FIG. 3 is an external view of the transmitting/receiving apparatus seen from the back to explain an outline for connecting the inventive transmitting/receiving apparatus to a local network.

FIG. 1 is a diagram showing the internal structure of a control circuit of a transmitting/receiving apparatus composing an inventive transmitting/receiving system, FIG. 2 shows one example of connection states of the transmitting/receiving system in which the respective transmitting/receiving apparatuses are connected via a network or telephone line and FIG. 3 is an external view of an example of connection of a transmitting/receiving apparatus.

The overall structure of the inventive transmitting/receiving system will be explained with reference to FIG. 2. A main transmitting/receiving apparatus 10 is connected to a local network (LAN) 100 and a plurality of other transmitting/receiving apparatuses 300 are connected to the network via a transceiver 50, respectively. The transmitting/receiving apparatus 10 is composed of a multi-function apparatus provided with a laser printer as a printing section, a scanner for reading a document image and a communication control section including a modem for transmitting data via a telephone line to the respective external transmitting/receiving apparatuses 200. The transmitting/receiving apparatus 10 is also connected to a personal computer or the like not shown in the LAN 100 and is arranged so as to be able to output hard copies of image data or the like created by the personal computer within the network by utilizing the printer of the transmitting/receiving apparatus 10.

The transmitting/receiving apparatus 10 is also connected to the external transmitting/receiving apparatuses 200 via a telephone line 201 to be able to send/receive required data among the respective transmitting/receiving apparatuses.

It is noted that the means for connecting the transmitting/receiving apparatus 10, the personal computer and other transmitting/receiving apparatuses 300 in the network is not limited to be the LAN. They may be connected directly with the personal computer system by using a parallel interface.

A connector 44 is provided on the back of the apparatus in the transmitting/receiving apparatus 10 described above as shown in FIG. 3 for example. This connector 44 is connected to a connector 46 connected to one end of a cable 45 for connecting with the LAN 100 to enable to send/receive data via the LAN 100. Therefore, the other end of the cable 45 is connected with a tap 47 attached to the LAN 100 via the transceiver 50.

Accordingly, it becomes possible to send/receive data between the transmitting/receiving apparatus 10 and the LAN 100 via a LAN I/F (interface) on the side of the transmitting/receiving apparatus 10 by connecting the connector 46 to the connector 44 on the side of the transmitting/receiving apparatus 10.

It is noted that the other transmitting/receiving apparatuses 300 connected in the network are connected to the LAN 100 via the transceiver 50 in the same manner with the transmitting/receiving apparatus 10 and the external transmitting/receiving apparatuses 200 connected via the telephone line 201 are also connected with the other transmitting/receiving apparatuses arbitrarily as necessary by the LAN 100 or the like.

Embodiment 1

Next, the system structure including the transmitting/receiving apparatus 10 connected via the network and the telephone line described above will be explained.

The transmitting/receiving apparatus 10 comprises an image information compressing/reproducing section 11 for coding and compressing image information to be transmitted and coding (reproducing) coded and compressed received image information to the original image information, an image information memory 12 composed of a volatile memory for storing image information being sent/received, a system memory 13 composed of a non-volatile memory and others for storing registration data, transfer result information and others, a control display section 14 such as various control keys and liquid crystal display provided to register and set the transmitting/receiving apparatuses of the transfer destination described later, a pattern generator 15 for transforming character codes into patterns and a transmission/receiving control section 16 composed of a CPU (central processing unit) for controlling the respective parts of the apparatus, a ROM for storing programs to be executed by the CPU and a RAM which turns out to be a working area in executing the program.

The transmitting/receiving apparatus 10 also comprises a line buffer memory 17 for temporarily storing data to be transferred, a scanner 19 for scanning an original to read an image to achieve the copier and facsimile functions, a printing section 18 composed of a laser printer and the like for outputting required image information and the like as a hard copy to achieve a printing function, a communication control section 20 for controlling transmission/receiving by means of G3/G4 for achieving the facsimile function, a modem 20A for modulating and demodulating transmitting/receiving image information, a network controller 20B for connecting the transmitting/receiving apparatus 10 to the telephone line and having an automatic calling/call-receiving functions and a system bus 21 for exchanging data among the respective sections. The transmission/receiving control section 16 controls the above-mentioned sections composing the transmitting/receiving apparatus 10 via the system bus 21.

The transmitting/receiving apparatus 10 also comprises a main power circuit 41 for supplying power to the respective sections composing the transmitting/receiving apparatus 10 and a backup power source 42 which is a spare power source for supplying power to the main sections of the transmitting/receiving apparatus 10 beside the main power circuit 41 when the main power source is shut down and operates by the supplied power. It then is provided with a switching control section 40 for switching the supply of power from the backup power source 42 by detecting the shut-down of the main power circuit 41. When the supply is switched to the backup power source 42 by the switching control section 40, power is fed to back up data stored at least in the image information memory 12.

The transmission/receiving control section 16 of the transmitting/receiving apparatus 10 is provided with a LAN I/F 30 which is an interface for transmitting/receiving data between the other transmitting/receiving apparatus 300 via the LAN 100 as shown in FIG. 2. The LAN I/F 30 enables the transmission/receiving between the LAN 100 when the connector 46 is connected to the connector 44 as explained in FIG. 3.

The LAN I/F 30 comprises a network controller having a function for controlling accesses in accordance to the known CSMA/CD (carrier sense multiple access with collision detection) scheme to be able to send data from the transmitting/receiving apparatus 10 to the LAN 100 and a serial interface adopter for converting the data sent from the transmitting/receiving apparatus 10 to the LAN 100 from parallel data to serial data and for converting serial data transmitted from the LAN 100 into parallel data to lead to the transmitting/receiving apparatus 10.

The other transmitting/receiving apparatuses 300 connected via the LAN 100 and the other transmitting/receiving apparatuses 200 connected to the outside via the telephone line 201 are constructed in the same manner with the transmitting/receiving apparatus 10. Then, the network control unit 20B of the transmitting/receiving apparatus 10 is connected the respective network control units 20B of the external transmitting/receiving apparatuses 300 via the telephone line 201 and can transmit/receive required data to/from the other party corresponding to a telephone number.

Figure 4:
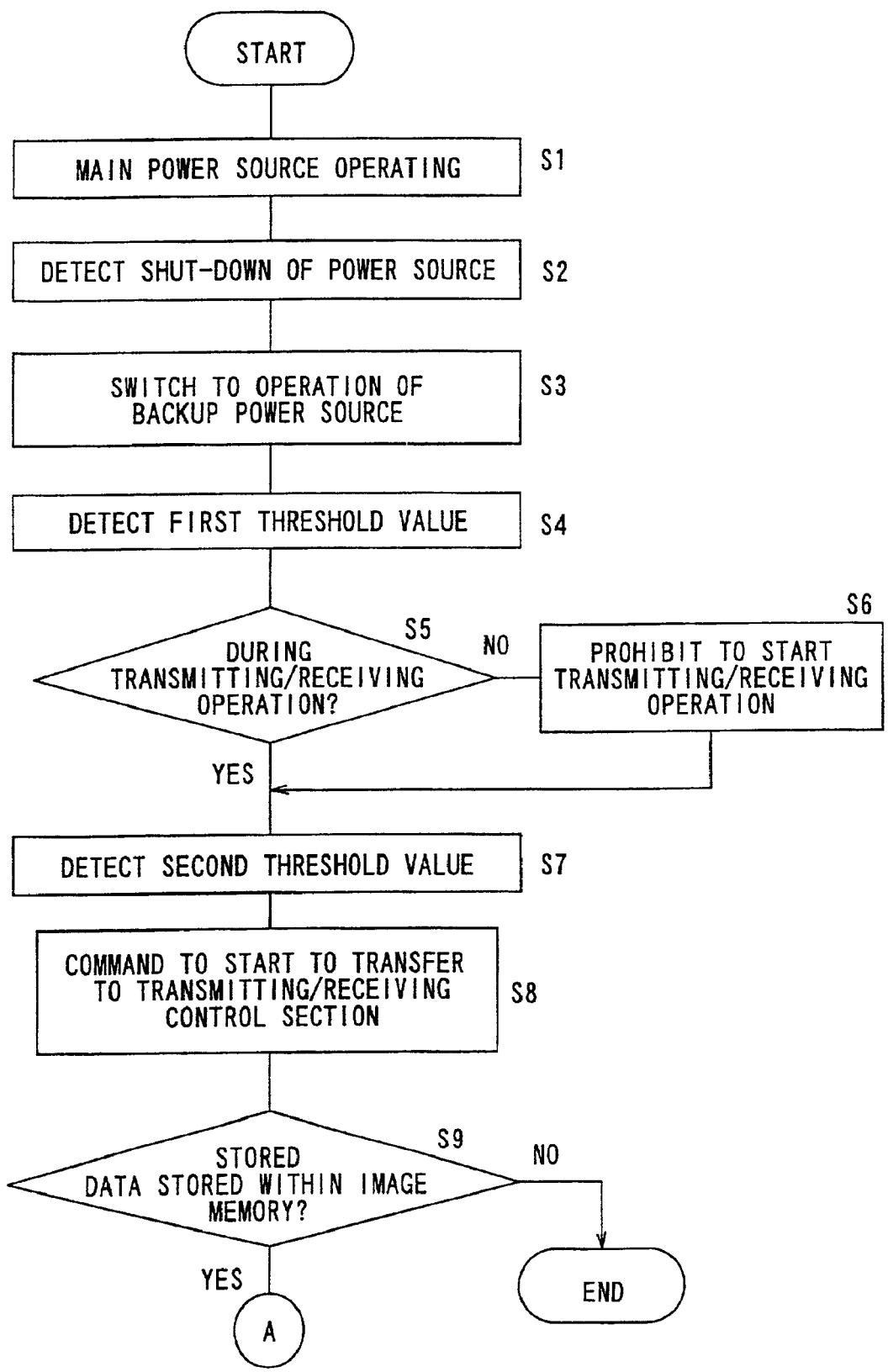
FIG. 4 is a flowchart of control made by the control circuit structure shown in FIG. 1 to achieve a function for backing up transmitting/receiving data by transferring to another transmitting/receiving apparatus of the system structure of the invention.
Figure 5:
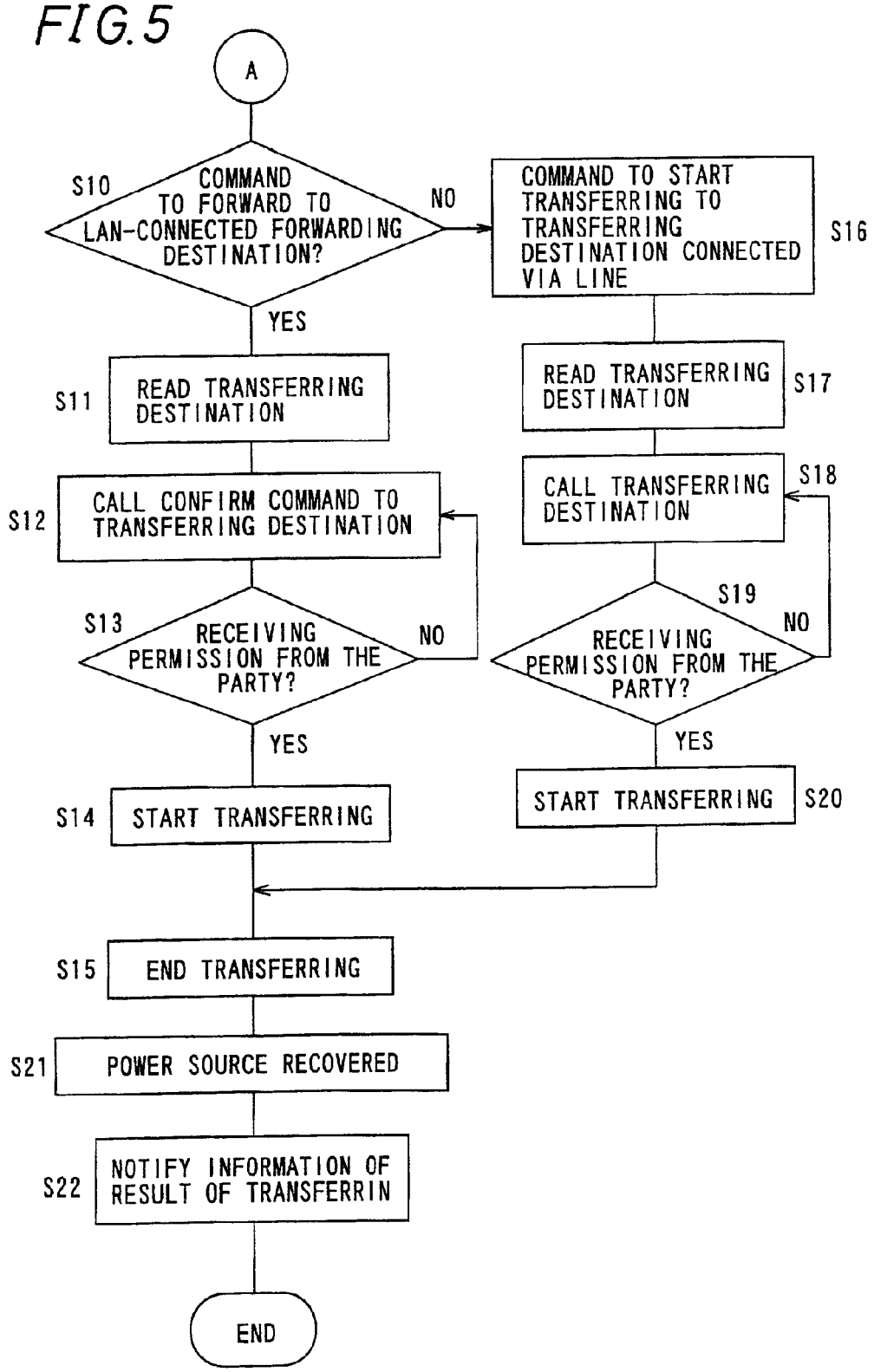
FIG. 5 is a control flowchart continued from the control flow chart in FIG. 4.

A control of the transmitting/receiving system structure for protecting (backing up) data in a transmitting/receiving apparatus 10 when its power source is shut down will be explained below with reference to a control flowchart to briefly explain data to be transmitted/received by the invention. FIGS. 4 and 5 show one example of the control flowchart.

The transmitting/receiving apparatus 10 will be explained mainly in FIG. 1 for example. When the transmitting/receiving apparatus 10 operates normally, a call is made to the telephone number of the other party so as to be able to connect to transmit/receive data via the telephone line 201 in the case of transmitting image information of the transmitting/receiving apparatus 10 to the other transmitting/receiving apparatuses 200. When it is connected so as to be able to transmit/receive data to/from the transmitting/receiving apparatus 200 of the other party, the image information of the transmitting/receiving apparatus 10 is transmitted to the transmitting/receiving apparatus 200 of the transmission destination.

The image information of the transmitting/receiving apparatus 10 is image information read by the scanner 19 in the case where the transmitting/receiving apparatus 10 is operated as a facsimile. When data transferred via the LAN 100 or the like from a personal computer not shown is character code data and the like, it may be transmitted to a transfer destination as image information by converting into bit information obtained by the pattern generator 15 and the like. When the data sent from the personal computer is very image information, the information is transmitted to the other party connected in the transmitting/receiving state as it is.

The required power is supplied and controlled from the main power circuit 41 to the respective sections by the transmission/receiving control section 16 in accordance to the instruction of the switching control section 40 when the image information is being transmitted to the other party connected in the transmitting/receiving state. The power is supplied especially to the image information memory 12 storing the image information to be transmitted to the other party to hold the memory. The power is supplied also to operate the scanner 19. The power is supplied also to display required information on the display of the control display section 14.

When image information of the other transmitting/receiving apparatus 300 is transmitted to the transmitting/receiving apparatus 10, the required power for storing and holding the image information is supplied by the main power circuit 41 described above in order to store the image information temporarily in the image information memory 12 and the like. Then, the power is supplied to the printing section 18 and operate the section 18 to output the received image information as a hard copy.

The operation of the transmitting/receiving apparatus 10 in transmitting/receiving the required image information will be explained below with reference to the flowchart in FIG. 4. At this time, the switching control section 40 does not detect to supply power to the respective sections which are required to operate (S1). When the power source is shut down due to a power failure or the like during that process, no power is supplied from the main power circuit 41. Therefore, when the switching control section 40 detects the shut-down of the power source (S2), the supply is switched automatically to the backup power source 42, i.e., the spare power circuit (S3). The power for the image information memory 12 is maintained by the power supplied from the backup power source 42.

When the electric energy of the backup power source 42 is greater than a first threshold value, the transmitting/receiving process is continued normally. Therefore, when the receiving process is being carried out, the first threshold value indicates an electric energy required for supplying power to the image information memory 12 and for operating the components, including the transmitting/receiving control section 16, required for storing the received image information data in the image information memory 12. In this case, no power needs to be supplied to the printing section 18 and the scanner 19 in the case of only storing the received data, and only an amount of power supply by which the transmitting/receiving apparatus 10 can be operated will be needed. In the transmitting process, when reading process is being carried out by the scanner 19, in addition an amount of electric energy for operating the scanner 19 is necessary.

Accordingly, when the electric energy greater than the first threshold value is assured in the backup power source 42 in S4, the operation of the transmitting/receiving process is continued by supplying power to the respective sections required for transmission/receiving data. Then, when the electric energy of the backup power source 42 becomes lower than the first threshold value, it is confirmed whether or not the transmitting/receiving process at the present time is being carried out in S5. When no transmitting/receiving process is carried out, the following transmitting/receiving operation is prohibited (S6). When the electric energy of the backup power source 42 drops further, it is confirmed whether or not it has reached a second threshold value (S7).

Then, the electric energy indicated by the second threshold value is equal to or larger than electric energy which enables the information stored in the image information memory 12 to be held. Then, when the electric energy drops to the second threshold value, a transfer command is issued to the transmission/receiving control section 16 to reliably protect (back up) the information stored in the image information memory 12 and to transfer and evacuate to any one of the other transmitting/receiving apparatuses 300 connected to the LAN 100 which is not shut down. The switching control section 40 confirms the drop of the power and makes a command (S8) to the transmission/receiving control section 16 at the point of time when the drop has reached to the second threshold value.

Detecting that the transfer command is inputted from the switching control section 40, i.e., the electric energy has dropped to the second threshold value, the transmission/receiving control section 16 confirms whether or not the transmitted/received data is stored in the image information memory 12 (S9). When there is no data to be stored, the all operation is completed at that moment of time.

When it is confirmed that the transmitting/receiving data is stored in the image information memory 12, the transmission/receiving control section 16 transfers the stored transmitting/receiving data to the transmitting/receiving apparatus 300 of the transfer destination which has been set and registered by the control display section 14 in advance. This is a process of step S14 shown in FIG. 5.

Thereby, power is supplied to the sections which require the power by the backup power source 42 at the moment of time when the power source of the transmitting/receiving apparatus 10 is shut down and the back up function becomes operative to transfer and store the data stored in the image information memory 12 to the other transmitting/receiving apparatus 300 which has been set and registered in advance depending on the state of power of the backup power source 42 in order to protect the data.

Here, when the power source is shut down, the other party to be set and registered, i.e., the transfer destination, is registered in the transmitting/receiving apparatus 10 in advance. The registration is carried out at the control display section 14 by registering and inputting specific ones of the other transmitting/receiving apparatuses, e.g., a facsimile machine, 300 connected via the LAN 100. In this case, it is preferable to set a plurality of registered destinations. That is, it is unable to transfer data while one of the transmitting/receiving apparatuses 300 is transmitting/receiving to/from the other party when the power source is shut down due to a trouble or the like. Then, the transfer of data on the transmitting/receiving apparatus 10 whose power source has been shut down cannot be accepted and the data cannot be protected when it becomes unable to transfer. Therefore, it is important to confirm whether it is possible to transmit/receive data to/from the other transmitting/receiving apparatuses 300 and to search and find the possible transmitting/receiving apparatus 300 one after another.

This will be explained with reference to FIG. 5. When it is required to protect data stored in the image information memory 12 of the transmitting/receiving apparatus 10, it is confirmed whether or not the transfer destination of the other transmitting/receiving apparatuses 300 connected to the LAN 100 have been registered (S10). Then, the transfer destinations are read in order of the registration or in accordance to the priority (S11) and a response of receiving permission for transfer is confirmed from the other party (S12, 13). That is, when a confirmation command is issued to the other party, the receiving permission is sent when the other party is making no transmitting/receiving operation and is in the standby state without shutting down the power source. When the transmitting/receiving apparatus 10 is unable to input the receiving permission however, it issues the confirmation command to the next registered party.

When the transmitting/receiving apparatus 10 receives the receiving permission from the other party by implementing the above-mentioned operations, the transmitting/receiving apparatus 10 reads the transmitting/receiving data stored in the image information memory 12 and starts to transfer to the transmitting/receiving apparatus 300 of the transfer destination from which the receiving permission has been obtained (S14). When the transmitting/receiving apparatus 10 completes the transfer (S15), transferring result information indicative of that the transfer has been carried out normally is transferred from the transmitting/receiving apparatus 300 of the transferring party and is stored in the system memory 13 which is a non-volatile memory of the transmitting/receiving apparatus 10. Thereby, it becomes possible to prevent the required data from being lost even when the power source is shut down due to a power failure or careless manipulation. In this case, the transferred data is stored in the image information memory 12 of the other transmitting/receiving apparatus 300 which normally operates. Accordingly, this memory may be a volatile memory.

Meanwhile, when the main power source recovers from the shut down and the transmitting/receiving apparatus 10 recovers (S21), the transmission/receiving control section 16 reads the transferring result information stored in its system memory 13, converts the character codes and others into dot pattern data via the pattern generator 15, causes the control display section 14 to display it (S22) to notify to the operator. Based on the contents of the display, the operator can find the transmitting/receiving apparatus 300 of the other party in which the data is protected. It is also possible to carry out a process for outputting a hard copy as necessary on the transmitting/receiving apparatus 300 of the other party. It is also possible to instruct to transfer the data from the transmitting/receiving apparatus 300 of the other party to the transmitting/receiving apparatus 10 which has required to protect the data.

When the main power source recovers from the shut down of the power source due to a power failure or the like (S21), it is also possible to notify to the operator by developing the transmitting/receiving apparatus 300 of the transfer destination in which the contents of the memory has been protected on the line buffer memory 17 and by outputting it on a recording sheet via the printing section 18 instead of or simultaneously with displaying the transmitting/receiving apparatus 300 of the transfer destination on the control display section 14 as described above.

It is noted that as for the criterion of the threshold value of the electric energy of the backup power source 42, the switching control section 40 detects it by measuring voltage of the backup power source and compares it with a voltage value decided based on that. Thereby, the switching control section 40 inputs the states of the respective threshold values, the transmission/receiving control section 16 controls the supply of power in accordance to the input and executes the above-mentioned processes.

Embodiment 2

According to embodiment 1 described above, when the power source of the transmitting/receiving apparatus 10 is shut down, the data is transferred to the other transmitting/receiving apparatuses 300 connected in the network to store in the image information memory 12 or the like of that transmitting/receiving apparatus 300 in order to protect the data stored in the image information memory 12.

However, some of the transmitting/receiving apparatuses 300 connected to the LAN 100 are set so that the normal power source is shut down during the night time. Then, there is a case when the data cannot be transferred to and protected by the transmitting/receiving apparatus 300 even when the data stored in the image information memory 12 needs to be transferred and protected as the power source of the transmitting/receiving apparatus 10 is shut down during the transmitting/receiving operation.

In such a case, it is possible to protect the data by transferring to the other transmitting/receiving apparatuses (facsimile machines) 200 externally connected via the telephone line 201. To that end, the transmitting/receiving apparatuses 200 of the transfer destination are set and registered via the control display section 14 in advance as described in embodiment 1.

This will be explained below with reference to FIG. 5. The process is shifted from step S10 to step S16 by instructing to start to transfer the data via the transmission/receiving control section 16 to automatically transfer to the external transmitting/receiving apparatus 200 connected via the telephone line 201 (S16).

The transmission/receiving control section 16 reads the telephone number or the like of the other parties registered in advance one after another (S17) to make a call to the other party to which the transfer is made (S18). When the other party is ready to receive for the call, it transmits a receiving permission (S19). However, when it is unable to receive, it sends back an 'unable' response to the transmitting/receiving apparatus 10. Then, the transmitting/receiving apparatus 10 reads and calls the telephone number of the next party registered in advance.

When the transmitting/receiving apparatus 10 thus finds the transmitting/receiving apparatus 200 which is able to receive, the transmitting/receiving apparatus 10 reads the data stored in the image information memory 12 of the transmitting/receiving apparatus 10, codes again by the image information compressing/reproducing section 11, converts into a coding scheme corresponding to the transmitting/receiving apparatus 200 of the other party to which the transfer is made and starts to transfer to the transmitting/receiving apparatus 200 of the other party (S20). When the transmitting/receiving apparatus 10 completes the transfer, the processes of steps S15 through S21 and S22 are executed as described in embodiment 1.

Accordingly, when it is unable to transfer to the other transmitting/receiving apparatus 300 connected to the LAN 100, it is possible to protect the data stored in the transmitting/receiving apparatus 10 whose power source is shut down by transferring to the transmitting/receiving apparatus 200 externally connected. The operator can find the transfer destination by outputting it on the control display section 14 or on a recording sheet when the main power source 41 recovers and the transmitting/receiving apparatus 10 becomes operable.

Meanwhile, when it is registered in advance to transfer to the transmitting/receiving apparatus 300 externally connected without transferring to the transmitting/receiving apparatus 300 connected to the LAN 100, it is confirmed that it is not the one connected to the LAN 100 in step S10 in FIG. 5 and then the process advances to step S16 to execute the above-mentioned processes.

Thus, the transfer destination may be set on the side of the transmitting/receiving apparatus 10 arbitrarily in advance, so that the transmitting/receiving apparatus 10 can select the transfer destination according to the setting. Therefore, it is very convenient to select a transmitting/receiving apparatus which is most preferable for the operator as a first transfer destination.

It is noted that it becomes possible to secure the secret at the other party by registering as "confidential transmission" for specific parties in the case of registering the other parties to which the transfer is made. That is, while there is a possibility that when data is transferred to the other transmitting/receiving apparatus, the transmitting/receiving apparatus of the transfer destination mixes up the transferred data of image information with normal receiving data and outputs as a hard copy, it is possible to prevent such a case from occurring by the "confidential transmission". Accordingly, it is one of important factors to select other parties from which the secret is secured in the confidential transmission.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A transmitting/receiving system provided with a data back-up function, comprising:

transmitting/receiving apparatuses connected to each other so as to be able to transmit/receive data via a network or telephone line, the transmitting/receiving apparatuses each including:

storage means for storing transmission/reception data, the storage means being constituted by a volatile memory;

control means for transferring, due to shut-down of a power source of one of the transmitting/receiving apparatuses, the data stored in the storage means of the one transmitting/receiving apparatus whose power source is shut down, to another transmitting/receiving apparatus which is connected to the one transmitting/receiving apparatus to store and hold the data; and a control section capable of arbitrarily setting and registering a plurality of destination transmitting/receiving apparatuses in order to transfer the data stored in the storage means due to shut-down of the power source, to the other transmitting/receiving apparatus, wherein, in response to shut-down of the power source, the control means confirms whether data can be transferred to the transmitting/receiving apparatuses which are connected via the network and set and registered, and the control means transfers the data stored in the storage means to a transmitting/receiving apparatus of the transmitting/receiving apparatuses which are connected via the network and set and registered to which the data can be transferred, and in the case where there is no transmitting/receiving apparatus among the transmitting/receiving apparatuses which are connected via the network and set and registered to which the data can be transferred, the control means confirms whether data can be transferred to external transmitting/receiving apparatuses which are connected via the telephone line and set and registered, and the control means transfers the data stored in the storage means to an external transmitting/receiving apparatus of the external transmitting/receiving apparatuses which are connected via the telephone line and set and registered to which the data can be transferred.

2. A transmitting/receiving system provided with a data back-up function, comprising:

transmitting/receiving apparatuses connected to each other so as to be able to transmit/receive data via a network or telephone line, the transmitting/receiving apparatuses each comprising:

storage means for storing transmission/reception data, the storage means being constituted by a volatile memory;

control means for transferring, due to shut-down of a power source of one of the transmitting/receiving apparatuses, the data stored in the storage means of the one transmitting/receiving apparatus whose power source is shut down, to another transmitting/receiving apparatus which is connected to the one transmitting/receiving apparatus to store and hold the data; and a control section capable of arbitrarily setting and registering a destination transmitting/receiving apparatus in order to transfer the data stored in the storage means of the one transmitting/receiving apparatus whose power source is shut down, to the other transmitting/receiving apparatus, wherein the control means is operable to allow a memory constituted by a non-volatile memory to store a result that the transfer of the data has been completed from the destination transmitting/receiving apparatus to which the data is transferred, and is operable to be notified of the destination transmitting/receiving apparatus to which the data has been transferred due to shut-down of the power source based on contents stored in the memory when the power is recovered.

3. The transmitting/receiving system provided with a data back-up function of claim 1, wherein the control section sets a confidential transmission in order to prevent an output of the data which is transferred while setting and registering the destination transmitting/receiving apparatus.

4. The transmitting/receiving system provided with a data back-up function of claim 2, wherein the control section sets a confidential transmission in order to prevent an output of the data which is transferred while setting and registering the destination transmitting/receiving apparatus.

* * * * *